(12) United States Patent
Kakimoto

(10) Patent No.: US 11,654,855 B2
(45) Date of Patent: May 23, 2023

(54) BASE FABRIC FOR AIRBAG

(71) Applicant: TOYODA GOSEI CO., LTD., Kiyosu (JP)

(72) Inventor: Kenji Kakimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 392 days.

(21) Appl. No.: 16/991,256

(22) Filed: Aug. 12, 2020

(65) Prior Publication Data
US 2021/0095402 A1 Apr. 1, 2021

(30) Foreign Application Priority Data
Sep. 27, 2019 (JP) .............................. JP2019-177699

(51) Int. Cl.
*B60R 21/213* (2011.01)
*D03D 11/02* (2006.01)
*D03D 1/02* (2006.01)
*D03D 1/04* (2006.01)
*B60R 21/235* (2006.01)
*B60R 21/232* (2011.01)

(52) U.S. Cl.
CPC .......... *B60R 21/213* (2013.01); *B60R 21/232* (2013.01); *B60R 21/235* (2013.01); *D03D 1/02* (2013.01); *D03D 1/04* (2013.01); *D03D 11/02* (2013.01); *B60R 2021/23509* (2013.01); *B60R 2021/23538* (2013.01); *D10B 2505/124* (2013.01)

(58) Field of Classification Search
CPC ... B60R 21/213; B60R 21/232; B60R 21/235; B60R 2021/23509; B60R 2021/23538; B60R 2021/23542; D10B 2505/124; D03D 1/02; D03D 1/04; D03D 11/02
See application file for complete search history.

(56) References Cited

U.S. PATENT DOCUMENTS

| | | | | |
|---|---|---|---|---|
| 5,098,125 A | * | 3/1992 | Thornton | B60R 21/235 139/389 |
| 5,651,395 A | * | 7/1997 | Graham | D03D 1/02 139/390 |
| 6,429,155 B1 | * | 8/2002 | Li | B32B 27/12 428/34.3 |
| 6,705,639 B2 | * | 3/2004 | Masuda | B60R 21/232 280/730.2 |
| 6,742,805 B2 | * | 6/2004 | Hill | B60R 21/235 280/730.2 |
| 7,559,345 B2 | * | 7/2009 | Hill | D03D 11/02 139/384 R |

(Continued)

FOREIGN PATENT DOCUMENTS

| | | |
|---|---|---|
| JP | 2011-111092 A | 6/2011 |
| JP | 2017193319 A * | 10/2017 |
| JP | 2019-064283 A | 4/2019 |

*Primary Examiner* — Laura Freedman
(74) *Attorney, Agent, or Firm* — Posz Law Group, PLC

(57) ABSTRACT

A base fabric for airbag is formed by a hollow weave in which a warp yarn and a weft yarn are woven to provide a bag portion having two woven fabric layers and a closing portion having one woven fabric layer, and includes a positioning hole. The positioning hole is formed by the closing portion on a peripheral edge thereof, and a non-weave portion in which the warp yarn and the weft yarn are not woven in an inner side of the closing portion.

3 Claims, 7 Drawing Sheets

(56) References Cited

U.S. PATENT DOCUMENTS

| | | | | |
|---|---|---|---|---|
| 7,780,194 | B2* | 8/2010 | Trondle | B60R 21/235 |
| | | | | 442/76 |
| 8,056,924 | B2* | 11/2011 | Hatfield | B60R 21/213 |
| | | | | 280/730.2 |
| 8,573,638 | B2* | 11/2013 | Hayashi | B60R 21/214 |
| | | | | 280/730.2 |
| 8,763,649 | B2* | 7/2014 | Becker | D03D 3/00 |
| | | | | 442/76 |
| 8,960,719 | B2* | 2/2015 | Iida | B60R 21/231 |
| | | | | 280/739 |
| 9,566,933 | B2* | 2/2017 | Jinnai | B60R 21/232 |
| 9,663,062 | B2* | 5/2017 | Rohn | B60R 21/232 |
| 9,738,995 | B2* | 8/2017 | Hirsch | D03D 15/50 |
| 10,005,419 | B2* | 6/2018 | Konaka | B60R 21/237 |
| 10,207,669 | B2* | 2/2019 | Konaka | B60R 21/232 |
| 10,315,611 | B2* | 6/2019 | Hill | B60R 21/213 |
| 10,611,099 | B2* | 4/2020 | Yanagisawa | B29C 70/46 |
| 10,836,341 | B2* | 11/2020 | Nonoyama | B60R 21/235 |
| 11,027,691 | B2* | 6/2021 | Nonoyama | B60R 21/231 |
| 2008/0079243 | A1* | 4/2008 | Kino | B60R 21/235 |
| | | | | 280/728.2 |
| 2009/0115178 | A1* | 5/2009 | Gomi | B60R 22/12 |
| | | | | 280/806 |
| 2012/0235391 | A1 | 9/2012 | Obara et al. | |
| 2019/0092265 | A1 | 3/2019 | Kakimoto | |

\* cited by examiner

BASE FABRIC FOR AIRBAG

CROSS-REFERENCE TO RELATED APPLICATIONS

This application is based upon and claims the benefit of priority from prior Japanese patent application No. 2019-177699, filed on Sep. 27, 2019, the entire contents of which are incorporated herein by reference.

TECHNICAL FIELD

The present invention relates to a base fabric for airbag which is formed by a hollow weave in which a warp yarn and a weft yarn are woven to provide a bag portion having two woven fabric layers and a closing portion having one woven fabric layer, and which includes a positioning hole, and relates to a base fabric for airbag used in a curtain airbag or the like mounted on a vehicle.

BACKGROUND ART

A base fabric for airbag used as a curtain airbag which is formed by a hollow weave in which warp yarns and weft yarns are woven, and which includes a bag portion that has two woven fabric layers and serves as a portion for causing inflation gas to flow into and inflate, and a closing portion that is arranged around the bag portion and has one woven fabric layer (see, for example, JP-A-2019-64283). In the base fabric for airbag, an attachment tab for attaching to a vehicle body side member on an upper edge side of a side window of a vehicle is attached so that the base fabric for airbag can be used as a curtain airbag covering the side window of the vehicle. Further, a positioning hole is disposed around an attachment position for positioning the attachment tab when the attachment tab is attached by sewing using an industrial sewing machine or the like.

However, such a positioning hole has been formed by a laser processing machine used for cutting after a large number of base fabrics for airbag are arranged in parallel and are formed by the hollow weave. Incidentally, when the base fabrics for airbag are formed by the hollow weave, a large number of base fabrics for airbag are prepared, and are cut into a predetermined shape by a laser processing of the laser processing machine.

However, in a case where the positioning hole is formed by drilling by the laser processing, since laser light is applied in an arc shape along an outer peripheral edge of a curved round hole at a position where the positioning hole is arranged, without drilling unnecessary holes in a periphery, it takes time. Further, since the number of positioning holes provided in one piece of the base fabric for airbag itself is large, it takes a lot of man-hours. As a result, the positioning hole cannot be easily disposed in the base fabric for airbag formed by the hollow weave.

The present invention solves the above-described problems, and an object thereof is to provide a base fabric for airbag in which a positioning hole can be easily disposed.

SUMMARY OF INVENTION

According to an aspect of the invention, there is provided a base fabric for airbag which is formed by a hollow weave in which a warp yarn and a weft yarn are woven to provide a bag portion having two woven fabric layers and a closing portion having one woven fabric layer, and which includes a positioning hole, wherein the positioning hole is formed by the closing portion on a peripheral edge thereof, and a non-weave portion in which the warp yarn and the weft yarn are not woven in an inner side of the closing portion.

DESCRIPTION OF EMBODIMENTS

Figure 1:
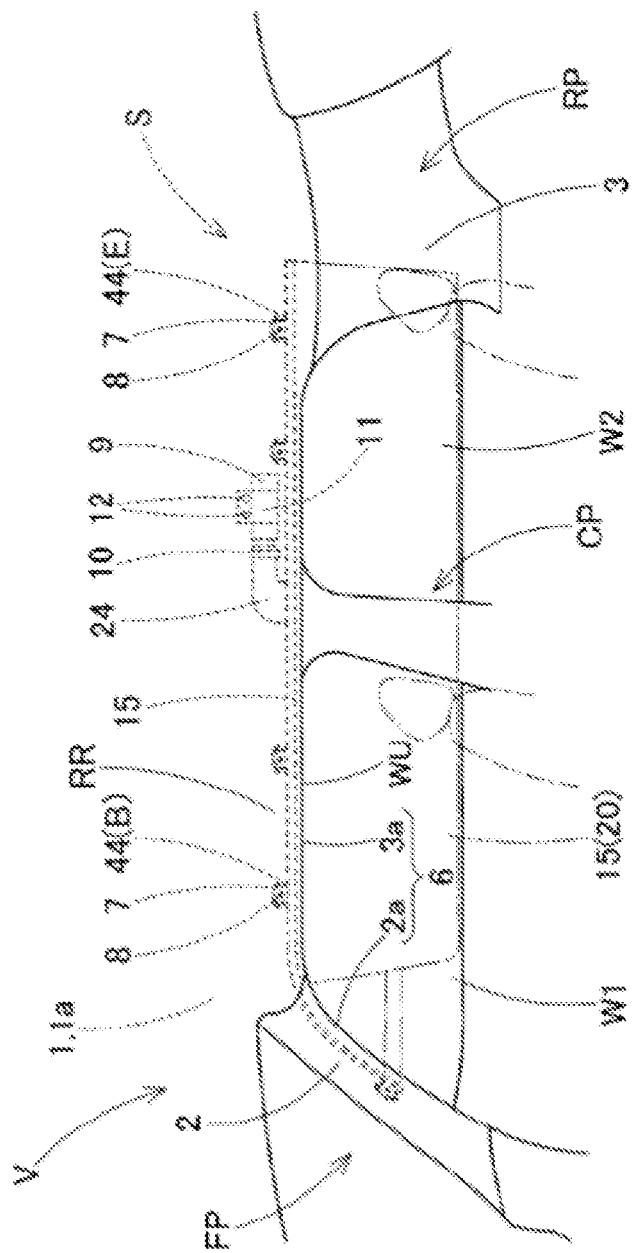
FIG. 1 is a schematic front view showing a mounting state of a curtain airbag device using a curtain airbag made of a base fabric for airbag according to an embodiment of the present invention to a vehicle as viewed from a vehicle interior side.

Hereinafter, an embodiment of the present invention will be described with reference to the drawings, and a base fabric for airbag 20 according to the embodiment is used for a curtain airbag 15 of a curtain airbag device S shown in FIG. 1. The curtain airbag device S according to the embodiment is mounted on a two-row seat type vehicle V having two front and rear side windows W1, W2. The curtain airbag device S includes a curtain airbag 15, an inflator 9, and an airbag cover 6. The airbag 15 is folded and accommodated on an upper edge WU side of the side windows W1, W2 on a vehicle interior side of the vehicle V from a lower edge side of a front pillar portion FP, through a lower edge side of a roof side rail portion RR, to an area above a rear pillar portion RP.

The airbag cover 6 is configured with a lower edge 2a of a front pillar garnish 2 arranged on the front pillar portion FP and a lower edge 3a of a roof head lining 3 arranged on the roof side rail portion RR, and is configured to be pushed by the airbag 15 to be opened toward the vehicle interior side in order to allow the airbag 15 to protrude downward toward the vehicle interior side at the time of deployment and inflation.

The inflator 9 supplies inflation gas to the airbag 15, and is a substantially cylindrical cylinder type. The inflator 9 includes a gas discharge port (not shown) capable of discharging the inflation gas arranged on a tip end side thereof, and is connected to the airbag 15 by inserting the tip end side including a vicinity of the gas discharge port into a connection port portion 24 to be described later of the airbag 15 and using a clamp 10 arranged on an outer peripheral side of the connection port portion 24. The inflator 9 is attached to a position above the rear side window W2 of an inner panel 1a on a body 1 side of the vehicle V using an attaching bracket 11. In addition, the inflator 9 is electrically connected to a control device (not shown) of the vehicle V via a lead wire (not shown), and operation upon receiving an operation signal from the control device when the control device detects a side collision, an oblique collision, and a rollover of the vehicle V.

Figure 2:
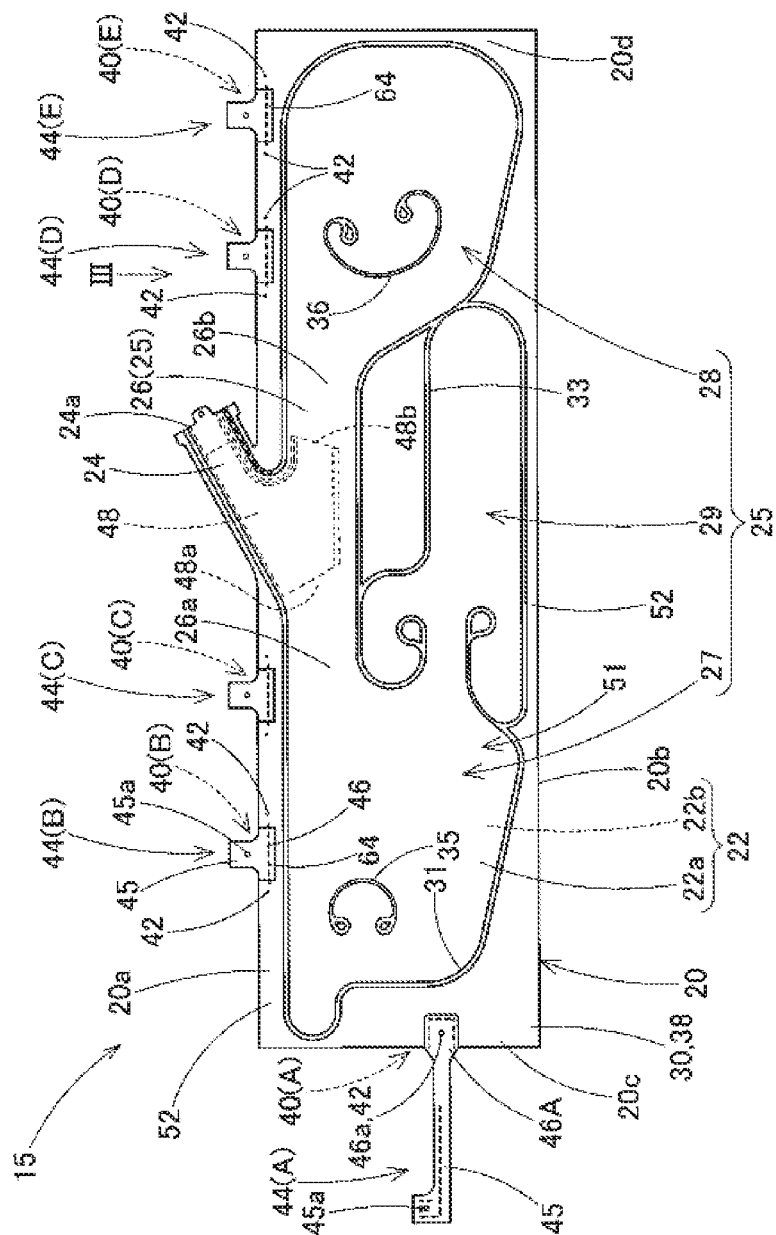
FIG. 2 is a front view showing a state in which a curtain airbag made of the base fabric for airbag according to the embodiment is flatly deployed.
Figure 3:
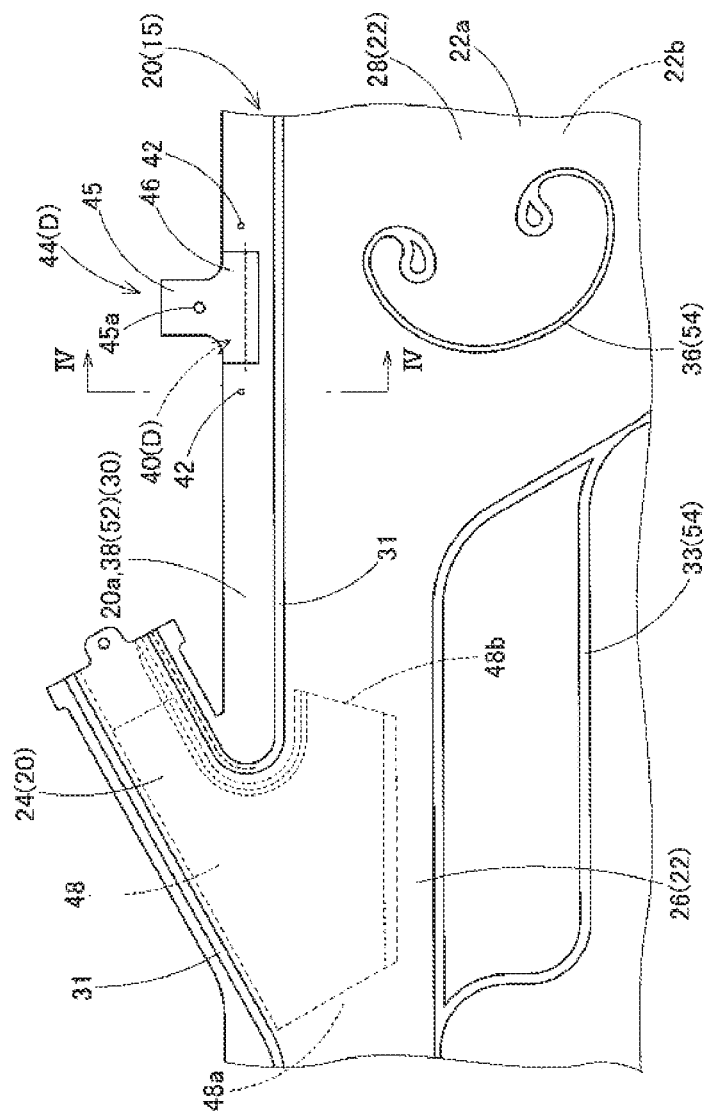
FIG. 3 is an enlarged view showing a portion III of FIG. 2.

As shown in FIGS. 2 and 3, the airbag 15 includes the base fabric 20 formed by a hollow weave using threads such as polyester or polyamide, attachment tabs 44 (A to E) attached to the base fabric 20, and an inner tube 48 disposed in the connection port portion 24 to be described later of the base fabric 20.

The base fabric 20 includes a gas inflow portion 22 into which the inflation gas flows and that is inflatable so as to separate a vehicle inner wall portion 22a and a vehicle outer wall portion 22b, and a non-inflow portion 30 into which the inflation gas does not flow.

The gas inflow portion 22 is configured by a bag portion 51 in which a woven fabric layer 51a is formed by a hollow weave in which warp yarns VS and weft yarns HS are woven. The woven fabric layer 51a is woven so as to have two layers (see FIGS. 4 to 5C). As shown in FIGS. 1 and 2, the gas inflow portion 22 of the embodiment includes a deployment and inflation portion 25 that deploys and inflates from a folded state so as to cover the vehicle interior side of the side windows W1, W2, and the connection port portion 24 that protrudes upward from a vicinity of a center in a front-rear direction of an upper edge 20a of the base fabric 20 and is connected to the inflator 9. In the deployment and inflation portion 25, a gas supply path portion 26 that is capable of supplying the inflation gas from the connection port portion 24 to both front and rear sides is disposed at the upper edge 20a of the base fabric 20, and a front inflation portion 27 capable of covering the vehicle interior side of the front side window W1, a rear inflation portion 28 capable of covering the vehicle interior side of the rear pillar portion RP from the rear side window W2, and an intermediate inflation portion 29 capable of covering the vehicle interior side of a front portion of the rear side window W2 from an intermediate pillar portion CP are disposed.

The non-inflow portion 30 includes a boundary portion 31 disposed at a peripheral edge of the gas inflow portion 22, a partition portion 33 that enters the gas inflow portion 22 from the boundary portion 31 and partitions the front inflation portion 27, the rear inflation portion 28, and the intermediate inflation portion 29 at a lower side of the gas supply path portion 26, and thickness regulating portions 35, 36 disposed inside the gas inflow portion 22. The boundary portion 31, the partition portion 33, and the thickness regulating portions 35, 36 are formed by a closing portion 54 in which a woven fabric layer formed by a hollow weave in which the warp yarns VS and the weft yarns HS are woven is woven so as to have a single layer (see FIG. 4).

Further, the non-inflow portion 30 of the base fabric 20 includes a peripheral edge portion 38 extending from the boundary portion 31 of the peripheral edge of the gas inflow portion 22 to an outer edge side. The peripheral edge portion 38 is disposed on the upper edge 20a, a lower edge 20b, a front edge 20c, and a rear edge 20d around the base fabric 20, and forms the edges 20a, 20b, 20c, and 20d. The peripheral edge portion 38 is configured by an end edge portion 52 in which a woven fabric layer 52a formed by a hollow weave in which the warp yarns VS and the weft yarns HS are woven is woven so as to have two layers (see FIG. 4).

In the embodiment, a raw yarn made of polyamide with a fineness of 350 dtex is used for the warp yarn VS and the weft yarn HS, the pick count of the warp yarns VS is set to 135 picks per inch, and the pick count of the weft yarns HS is set to 121 picks per inch. Further, the closing portion 54 is formed of a plain weave of 1×1 tissue or the like, the woven fabric layers 51a, 52a of the bag portion 51 and the peripheral edge portion 38 are formed of a twill weave of 1×2 tissue or the like. Similar to the closing portion 54, a closing portion 56 of a positioning hole 42, which will be described later, is formed of a plain weave of 1×1 tissue or the like.

The inner tube 48 is made of a cloth material formed by a plain weave or the like using a thread of polyamide or the like, is formed so as to be branched into a trifurcate shape, and is disposed in the connection port portion 24. The inner tube 48 disposed in the connection port portion 24 causes the inflation gas flowing into the connection port portion 24 from an opening 24a side of the connection port portion 24 to flow toward the front of a front end 26a or a rear end 26b side of the gas supply path portion 26 from front and rear openings 48a, 48b on a lower end side, and then to flow into the front inflation portion 27 and the rear inflation portion 28.

The attachment tabs 44 (A to E) are made of a cloth material formed by a plain weave using a thread of polyamide or the like, and are attached to the peripheral edge portion 38 on the front edge 20c side and the upper edge 20a side of the base fabric 20 by sewing using suture threads 64. Each of the attachment tabs 44 includes an attachment base portion 46 attached to the base fabric 20, and a main body 45 extending from the attachment base portion 46. The main body 45 is provided with an attachment hole 45a through which an attachment tool 8 such as an attaching bolt for attaching the airbag 15 to the upper edge WU side of the side windows W1, W2 is inserted. Incidentally, the main body 45 is provided with an abutting plate 7 such as a sheet metal, and is attached to the inner panel 1a on the upper edge WU side of the side windows W1, W2 together with the abutting plate 7 by the attachment tool 8.

The attachment tab 44A on a front end side is disposed so that the main body 45 is extended forward from the front edge 20c side of the base fabric 20 and can be used as a tension belt for generating tension on the lower edge side of the airbag 15 when the inflation of the airbag 15 is completed, and the other attachment tabs 44B, 44C. 44D and 44E are disposed so as to extend the respective main bodies 45 upward from the upper edge 20a side of the base fabric 20.

The base fabric 20 is provided with the positioning holes 42 at the time of sewing corresponding to attachment positions of the attachment tabs 44 (A to E), specifically, attachment positions 40 (A to E) of the respective attachment base portions 46. The positioning holes 42 disposed at the attachment position 40A of the attachment tab 44A are disposed corresponding to positioning holes 46a arranged at a center of the attachment base portion 46A, and the positioning holes 42 disposed at the attachment positions 40 (B to E) of the other attachment tabs 44 (B to E) are respectively disposed on both front and rear sides of the attachment positions 40 (B to E).

Figure 4:
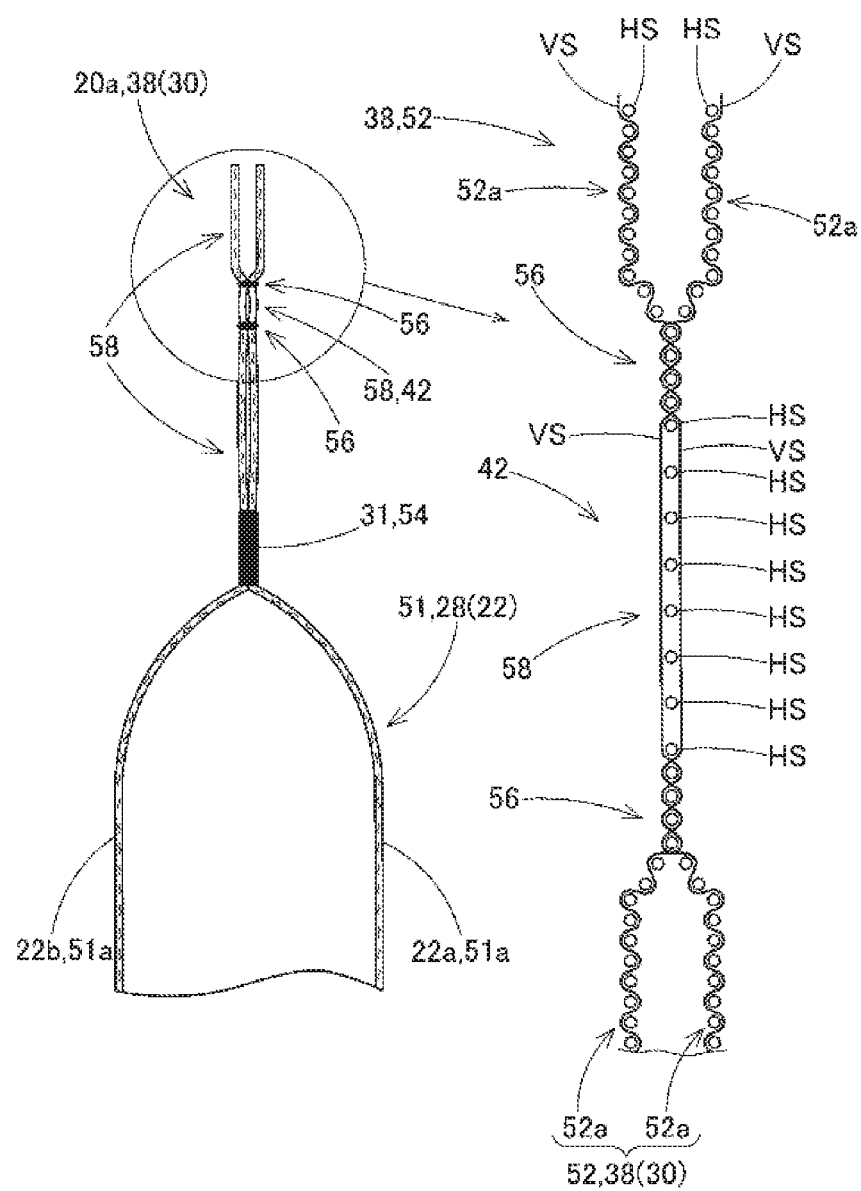
FIG. 4 is an enlarged schematic sectional view taken along a line IV-IV of FIG. 3.
Figure 5A:
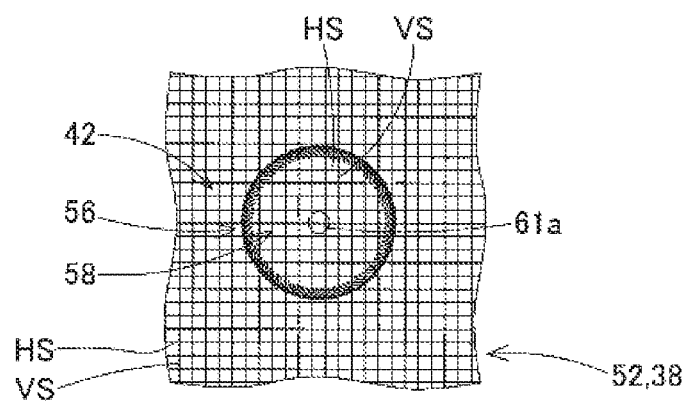
FIGS. 5A to 5C are front views showing states in which a positioning pin is inserted in a positioning hole according to the embodiment.
Figure 5B:
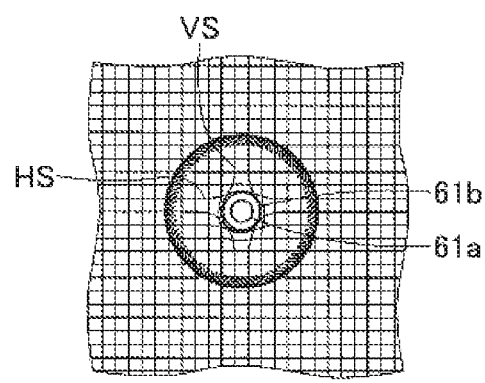
Figure 5C:
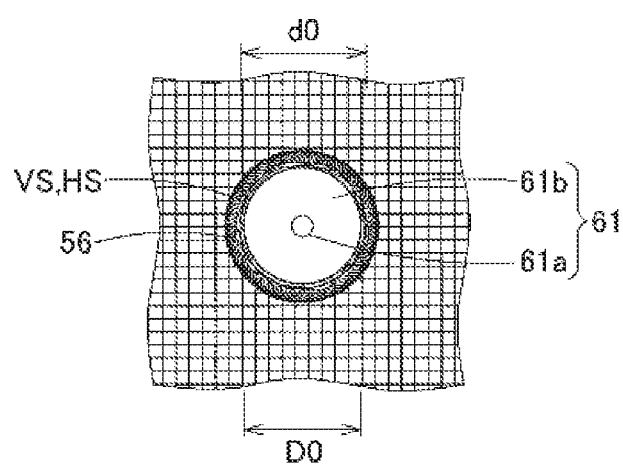

As shown in FIGS. 4 to 5C, each of the positioning holes 42 is formed by a closing portion 56 on a peripheral edge thereof, and a non-woven portion 58 in which the warp yarn VS and the weft yarn HS are not woven and are simply intersected in an inner side of the closing portion 56. In addition, the positioning hole 42 of the embodiment is formed by disposing the closing portion 56 on the peripheral edge with an area of the non-weave portion 58 being circular. The positioning hole 42 is disposed in the peripheral edge portion 38 of the non-inflow portion 30 into which the inflation gas does not flow at an outer peripheral edge of the base fabric 20, and the peripheral edge portion 38 is formed by disposing the two-layer woven fabric layers 52a. As shown in FIG. 4, in a vicinity of the positioning hole 42, the end edge portion 52 having the two-layer woven fabric layers 52a is disposed around the annular closing portion 56 which is a single woven fabric layer in which the warp yarn VS and the weft yarn HS are woven, and the circular non-woven portion 58 in which the warp yarn VS and the weft yarn HS are simply disposed in a lattice shape is disposed inside the closing portion 56.

In the case of the embodiment, an inner diameter d0 of the non-woven portion 58 in the positioning hole 42 is about 6 mm, and an outer diameter DO of a positioning pin 61 to be described later is about 5 mm.

Figure 6A:
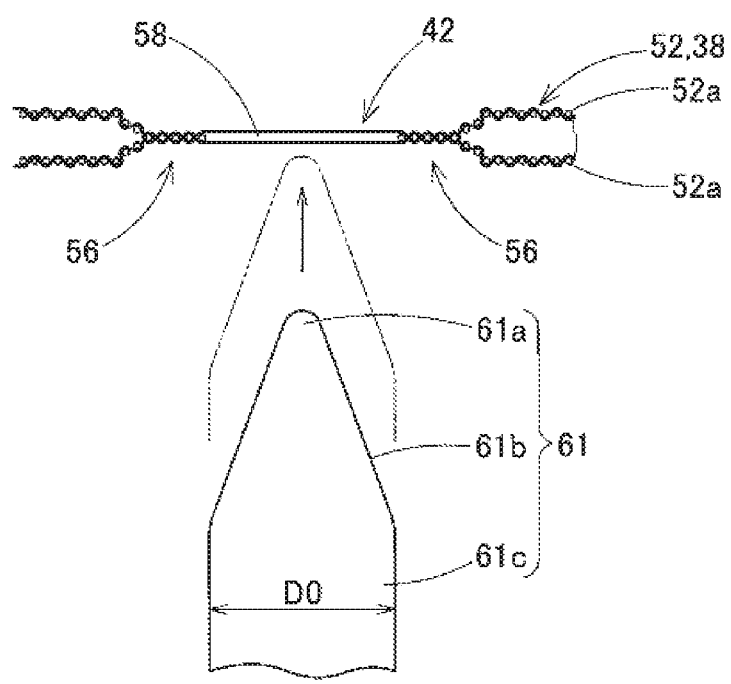
FIGS. 6A and 6B are sectional views showing the states in which the positioning pin is inserted into the positioning hole according to the embodiment.
Figure 6B:
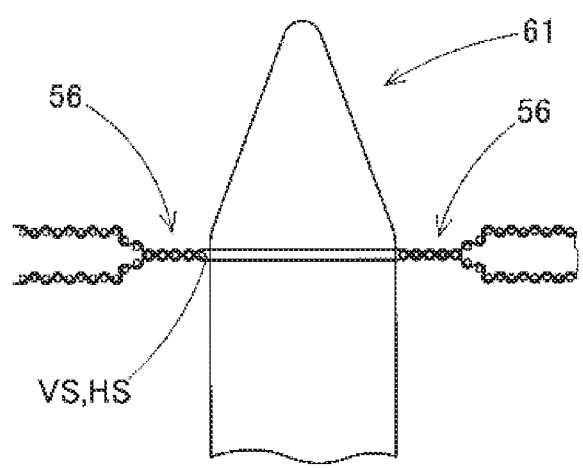
Figure 7A:
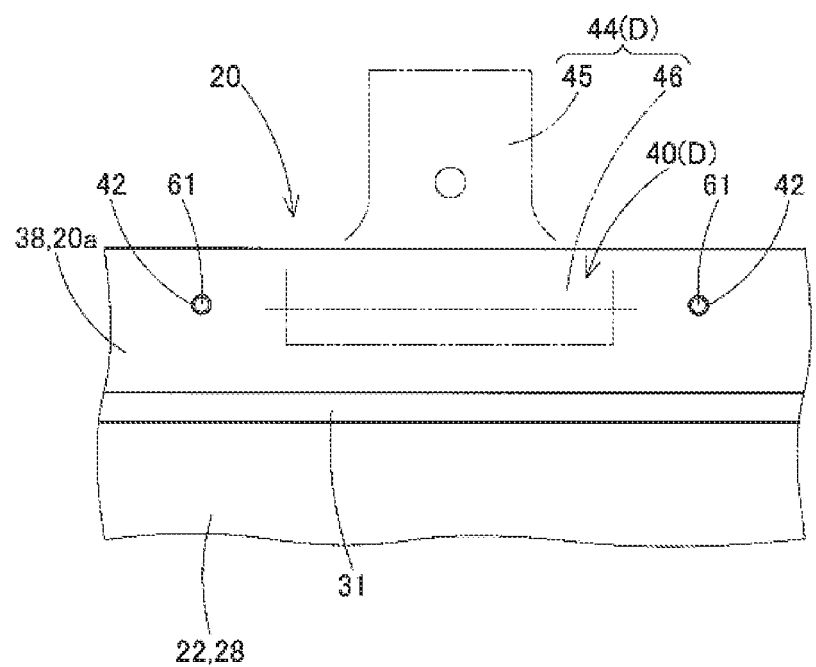
FIGS. 7A and 7B are views for explaining a work of attaching an attachment tab to the base fabric for airbag according to the embodiment to manufacture a curtain airbag.
Figure 7B:
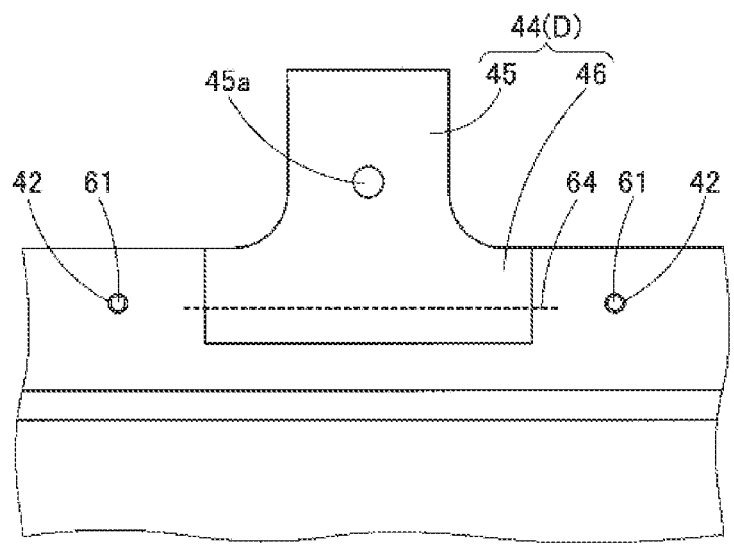

When attaching the attachment tab 44 to the base fabric 20, first, the positioning pin 61 provided on a workbench 60 used at the time of a sewing work is inserted into each of the positioning holes 42. At this time, as shown in FIGS. 5A and 5B, a tip end 61a of a tapered taper portion 61b of the positioning pin 61 enters a lattice gap between the warp yarn VS and the weft yarn HS, and further, the warp yarn VS and the weft yarn HS around the tip end 61a to be pushed in are pressed against the closing portion 56 side of the outer peripheral edge of the non-woven portion 58. As shown in FIG. 5C and FIGS. 6A and 6B, a main body 61c of the positioning pin 61 is arranged so as to be in contact with an inner peripheral side of the closing portion 56 with the pressed warp yarn VS and weft yarn HS interposed therebetween, and a work of inserting the positioning pin 61 into the positioning hole 42 is completed. When corresponding positioning pins 61 are also inserted into the other positioning holes 42, and the base fabric 20 is set on the workbench 60, the attachment positions 40 (A to E) of the attachment tabs 44 (A to E) can be accurately arranged on the workbench 60. Thereafter, the attachment base portions 46 of the attachment tabs 44 (A-E) are arranged in the corresponding attachment positions 40 (A-E), and the attachment base portions 46 are sewn to the base fabric 20 by automatic sewing with an industrial sewing machine using the predetermined suture threads 64 as shown in FIGS. 7A and 7B, so that the curtain airbag 15 in which the attachment tabs 44 are attached to the base fabric 20 can be manufactured.

Thereafter, the inner tube 48 is disposed in the connection port portion 24, the abutting plate 7 is attached to each attachment tab 44, the curtain airbag 15 is folded, and the inflator 9 having the attaching bracket 11 assembled is inserted into the connection port portion 24, thereby forming an airbag assembly. In the airbag assembly thus formed, when each abutting plates 7 together with the attachment tab 44 is attached to the inner panel 1a using the attachment tool 8, the attaching bracket 11 assembled to the inflator 9 is bolted to the inner panel 1a by bolts 12, and the operation lead wire extending from the control device (not shown) is connected to the inflator 9, the airbag assembly can be attached to the vehicle V, and the curtain airbag device S can be mounted on the vehicle V (see FIG. 1).

After the curtain airbag device S is mounted on the vehicle V, when the inflator 9 operates upon receiving the operation signal from the control device at the time of a side collision, an oblique collision, and a rollover of the vehicle V, the inflation gas discharged from the inflator 9 flows into the gas supply path portion 26 through the connection port portion 24, and then flows into the inflation portions 27, 28, and 29 from the gas supply path portion 26, and the curtain airbag 15 pushes and opens the airbag cover 6 made up of the lower edges 2a. 3a of the pillar garnish 2 and the roof head lining 3, and largely deploys and inflates so as to cover a vehicle interior side 1 of the side windows W1, W2, the intermediate pillar portion CP, and the rear pillar portion RP as indicated by a chain double-dashed line in FIG. 1.

In the base fabric 20 of the embodiment, in a hollow weave for manufacturing the base fabric 20, the closing portion 56 is formed by the hollow weave so as to surround an outer peripheral edge of the positioning hole 42, and the positioning hole 42 is formed with the non-woven portion 58 in which the warp yarn VS and the weft yarn HS used in the hollow weave are not woven in an inner side area of the positioning hole 42. As shown in FIGS. 5A to 5C and FIGS. 6A and 6B, when the positioning pin 61 is inserted into the positioning hole 42, if the positioning pin 61 is inserted into the non-woven portion 58 formed by simply intersecting the warp yarn VS and the weft yarn HS, the positioning pin 61 can be easily inserted toward the closing portion 56 side of the outer peripheral edge of the positioning hole 42 only by shifting the warp yarn VS and the weft yarn HS in an area of the non-woven portion 58. Further, the positioning hole 42 can be simply formed by simply forming the closing portion 56 and the non-woven portion 58 during the hollow weave the base fabric 20 without performing a drilling processing such as the laser processing.

Therefore, in the base fabric 20 of the embodiment, it is possible to simply dispose the positioning holes 42 without performing a drilling processing separately.

In the base fabric 20 of the embodiment, the positioning hole 42 is formed by disposing the closing portion 56 on the peripheral edge of the non-woven portion 58 with the area of the non-weave portion 58 being circular.

Therefore, in the embodiment, when the positioning pin 61 having a circular cross section is inserted into the positioning hole 42, it is easy to shift the warp yarn VS and the weft yarn HS of the non-woven portion 58 from a center side to the outer peripheral edge side at the time of insertion in a substantially radial manner, that is, a center of the positioning hole 42 can be stably arranged corresponding to the positioning pin 61 to be inserted, and the base fabric 20 can be arranged at a predetermined arrangement position at which the position of the positioning hole 42 is regulated, so that the subsequent sewing work or the like on the base fabric 20 can be performed with high accuracy.

The base fabric 20 of the embodiment is used as the curtain airbag 15 that is disposed on the upper edge W U side of the side windows W1, W2 of the vehicle V, and is configured by attaching the attachment tabs 44 (A to E) for attaching the airbag 15 to the inner panel 1a as a vehicle body side member of the side windows W1, W2 by sewing. Further, the positioning holes 42 are disposed corresponding to the attachment positions 40 (A to E) of the attachment tabs 44 (A to E) with respect to the base fabric 20 when the attachment tabs 44 (A to E) are sewn.

In the embodiment, the base fabric 20 formed by the hollow weave is configured to be used as the curtain airbag 15, the curtain airbag 15 is formed by attaching a large number of attachment tabs 44 (A to E), and the positioning holes 42 are disposed in the base fabric 20 corresponding to the attachment positions 40 (A to E) of a large number of attachment tabs 44 (AE) to be attached. Therefore, when the corresponding positioning pins 61 are inserted into the respective positioning holes 42, and the base fabric 20 is placed on the workbench 60 for the sewing work, the attachment positions 40 of the attachment tabs 44 can be accurately arranged on the workbench 60, and then the attachment tabs 44 can be smoothly sewn to predetermined attachment positions of the base fabric 20, so that the curtain airbag 15 can be easily manufactured.

In the embodiment, the base fabric 20 is used for the curtain airbag 15, and the positioning pin 61 is inserted into the positioning hole 42 when the attachment tab 44 is sewn. However, the positioning hole may be used so that the airbag made of the base fabric for airbag is inserted into a locking pin, an attachment pin, or the like at a predetermined arrangement position and is arranged at a predetermined position. In addition, the airbag made of the base fabric for airbag is not limited to the curtain airbag, and the present invention can also be applied to a base fabric for airbag such as other pedestrian airbags.

Although the positioning hole provided in the base fabric for airbag is exemplified by a case where the non-woven portion 58 has the circular shape as in the embodiment, the non-woven portion 58 may have a quadrangle shape such as a rectangular shape or a triangular shape corresponding to a shape of the positioning pin, the locking pin, the attachment pin, or the like to be inserted into the positioning hole.

In the base fabric 20 used for the curtain airbag 15 may be coated with a coating layer for preventing gas leakage such as silicon at the same time as the hollow weave, but when the positioning pin 61 is inserted into the non-woven portion 58 in which the warp yarn VS and the weft yarn HS of the embodiment simply intersect in a lattice pattern without being woven, the warp yarn VS and the weft yarn HS can be easily shifted without being affected by the coating layer, and the positioning pin 61 can be inserted.

According to an aspect of the invention, there is provided a base fabric for airbag which is formed by a hollow weave in which a warp yarn and a weft yarn are woven to provide a bag portion having two woven fabric layers and a closing portion having one woven fabric layer, and which includes a positioning hole, wherein the positioning hole is formed by the closing portion on a peripheral edge thereof, and a non-weave portion in which the warp yarn and the weft yarn are not woven in an inner side of the closing portion.

In the base fabric for airbag according to the present invention, in a hollow weave for manufacturing the base fabric for airbag, the closing portion formed by the hollow weave is formed so as to surround the outer peripheral edge of the positioning hole and the positioning hole is formed to have the non-weave portion in which the warp yarn and the weft yarn used in the hollow weave are not woven in an inner side area of the positioning hole. When the positioning pin is inserted into the positioning hole, if the positioning pin is inserted into the non-woven portion formed by simply intersecting the warp yarn and the weft yarn, the positioning pin can be easily inserted toward the closing portion side of the outer peripheral edge of the positioning hole only by shifting the warp yarn and the weft yarn in an area of the non-woven portion. Further, the positioning hole can be simply formed by simply forming the closing portion and the non-woven portion during the hollow weave of the base fabric for airbag without performing a drilling processing such as a laser processing.

Therefore, in the base fabric for airbag according to the present invention, it is possible to simply dispose the positioning hole without performing a drilling processing separately.

In the base fabric for airbag according to the present invention, it is preferable that the positioning hole is formed by disposing the closing portion on a peripheral edge of the non-weave portion with an area of the non-weave portion being circular.

In such a configuration, when the positioning pin having a circular cross section is inserted into the positioning hole, it is easy to shift the warp yarn and the weft yarn of the non-woven portion from a center side to an outer peripheral edge side at the time of insertion in a substantially radial manner, that is, a center of the positioning hole can be stably arranged corresponding to the positioning pin to be inserted, and the base fabric for airbag can be arranged at a predetermined arrangement position at which the position of the positioning hole is regulated, so that a subsequent sewing work or the like on the base fabric for airbag can be performed with high accuracy.

In a case where the base fabric for airbag according to the present invention is used as a curtain airbag that is disposed on an upper edge side of a side window of a vehicle, and an attachment tab for attaching to a vehicle body side member of the side window is attached to the base fabric for airbag by sewing, it is preferable that the positioning hole is disposed corresponding to an attachment position of the attachment tab with respect to the base fabric for airbag when the attachment tab is sewn.

In such a configuration, in the case where the base fabric for airbag formed by the hollow weave is used as the curtain airbag with the attachment tab attached, a large number of attachment tabs are attached, but the positioning holes are disposed corresponding to the attachment positions of the attachment tabs to be attached. Therefore, when the corresponding positioning pins are inserted into the respective positioning holes, the base fabric for airbag is placed on a workbench for the sewing work, the attachment positions of the attachment tabs can be accurately arranged on the workbench, and then the attachment tabs can be smoothly sewn to predetermined attachment positions of the base fabric for airbag, so that the curtain airbag can be easily manufactured.

The invention claimed is:

1. A base fabric for an airbag which is formed by a hollow weave in which a warp yarn and a weft yarn are woven to provide a bag portion having two woven fabric layers and a closing portion having one woven fabric layer, and which includes a positioning hole, wherein
    the positioning hole is formed by the closing portion on a peripheral edge thereof, and a non-weave portion in which the warp yarn and the weft yarn are not woven is in an inner side of the closing portion.

2. The base fabric for the airbag according to claim 1, wherein
    the positioning hole is formed by disposing the closing portion on a peripheral edge of the non-weave portion with an area of the non-weave portion being circular.

3. The base fabric for the airbag according to claim 1, wherein
    the base fabric for the airbag is used as a curtain airbag that is disposed on an upper edge side of a side window of a vehicle, and an attachment tab for attaching to a vehicle body side member of the side window is attached to the base fabric for the airbag by sewing, and
    the positioning hole is disposed corresponding to an attachment position of the attachment tab with respect to the base fabric for the airbag when the attachment tab is sewn.

* * * * *